No. 648,672. Patented May 1, 1900.
F. W. ROLLER.
INDICATING INSTRUMENT.
(Application filed Mar. 30, 1899.)
(No Model.)
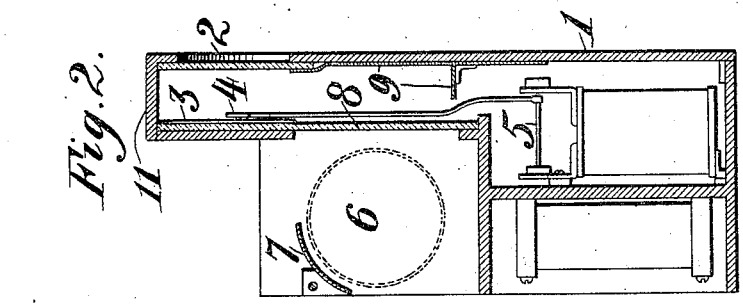
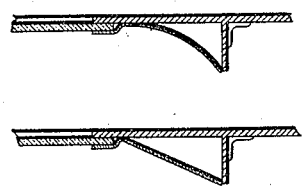
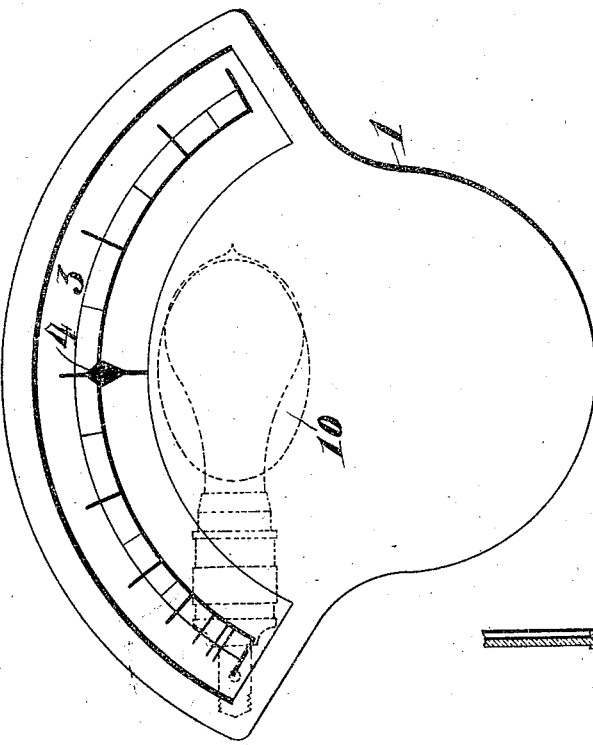
Witnesses
Alex Ferguson
D. M. Edwards
Frank W. Roller Inventor
By his Attorney C. W. Edwards

UNITED STATES PATENT OFFICE.

FRANK W. ROLLER, OF NEW YORK, N. Y.

INDICATING INSTRUMENT.

SPECIFICATION forming part of Letters Patent No. 648,672, dated May 1, 1900.

Application filed March 30, 1899. Serial No. 711,151. (No model.)

*To all whom it may concern:*

Be it known that I, FRANK W. ROLLER, a citizen of the United States, residing at New York, in the county of New York and State of New York, have invented certain new and useful Improvements in Indicating Instruments, of which the following is a full, clear, and exact specification.

This invention relates to indicating instruments, and has particular reference to the means for illuminating the face-dial thereof.

The object of the invention is to provide a simple and efficient means for lighting the dial with a diffused light.

In the instruments heretofore constructed having illuminated dials it has been suggested to locate behind a translucent dial-plate one or more lamps; but this has been found in practice to be objectionable, because the light is not diffused thoroughly and the diffused light is not evenly directed upon the plate. The various points upon the dial-plate cannot, therefore, be readily distinguished from all points of vision. According to my invention I propose to obviate these difficulties by diffusing the light and then casting the diffused light upon the indicating-dial, thereby making it possible to read the scale from all points of vision.

The invention also comprehends other features of advantage, which will be more particularly described hereinafter and pointed out in the appended claims.

In the accompanying drawings I have illustrated forms which the invention may take in practice, and in which—

Figure 1 is a front view of an indicating instrument embodying my invention. Fig. 2 is a sectional view of Fig. 1, and Figs. 3, 4, 5, and 6 are detail sectional views of modified forms of reflectors.

The instrument shown in the drawings is one used for the measurement of electric currents, and the invention herein described will be found to be particularly applicable for use in connection with electric currents; but it is to be understood that the invention may be applied to the face-plate of any indicating instrument.

In the drawings, 1 represents the casing, having an opening 2 therein, through which the indicating-dial 3, having the usual calibrated scale, is adapted to be seen. The pointer or indicating-needle 4 is adapted to move across the dial 3 to indicate the measure which the instrument is to record, and in this instance is shown as being mounted upon the spindle 5 and vibrated thereon by the influence of the current to be measured. A source of light 6, in this instance shown as an incandescent lamp, is provided, and a reflector 7 is adapted to throw all the light therefrom through a translucent plate 8 upon a diffusing-plate 9, from whence the rays of light are deflected toward the dial 3. Obviously the plate 8 is not an essential feature of the invention and is shown herein for the reason that it is desirable to inclose the operating parts of the indicating instrument in a closed case. If employed, the plate 8 may be transparent, entirely translucent, or, preferably, opaque, and provided with a translucent portion 10. (Shown in Fig. 1.) The plate 9 may be of any suitable material or construction to diffuse the rays of light coming from the lamp. Under practical conditions it will be found advantageous to construct it of non-translucent material with a white diffusing-surface, whereby the passage of the rays of light through the plate will be prevented, and the light will be more effectually directed against the dial. In the drawings I have shown the plate 9 so located that it will also act as a reflector of the diffused light, casting the same upon the indicating-dial. I prefer not to polish the plate 9, but to provide it with a non-polished white surface, whereby the rays of light will be diffused, and to make it non-translucent, whereby the rays of diffused light will be directed toward the indicating-dial. Other means may, however, be utilized for the purpose of diffusing or reflecting the light. Likewise the shape of the diffusing-plate is not an essential feature of the invention. It may comprise two perpendicular surfaces, as illustrated in Figs. 2 and 6, or may be a concave or convex surface, as illustrated in Figs. 4 and 5, or may be simply a straight surface at an angle to the lamp, as illustrated in Fig. 3.

It may be noted that the reflector 7 may be dispensed with and the plate 8 made either transparent or translucent. Either one of the reflectors 7 or 9 must be adapted to diffuse the rays of light. It is of course immaterial whether the light be diffused by the reflector 7 or 9, and for the proper operation of the device at least one of the reflectors should diffuse the light.

In operation the rays of light from the lamp striking the diffusing-plate 9 will be diffused and the diffused light reflected upon the indicating-dial, thus lighting up evenly the entire chamber, formed by the dial 3, the top 11 of the casing 1, and the front wall of the casing. This will enable the instrument to be accurately and easily read from any point of vision.

I am aware that it has been proposed to illuminate the dials of instruments by reflecting the rays of light from a lamp upon the dial; but so far as I am aware the light has always been reflected in an undiffused condition. It has not been diffused and the diffused light cast upon the dial. I therefore do not claim, broadly, the idea of reflecting light upon the dial in an undiffused condition.

By my invention the dial may be read from any position, and none of the characters upon the dial will be rendered obscure by reason of the reflection or refraction of undiffused rays, such as heretofore rendered all illuminated dials more or less objectionable.

Having thus described my invention, I declare that what I claim as new, and desire to secure by Letters Patent, is—

1. In an indicating instrument, the combination of an indicating-dial, a source of light, means for diffusing the rays of light from said source, and for directing said diffused light upon said dial, substantially as described.

2. In an indicating instrument, the combination of an indicating-dial, a source of light, means for diffusing the rays of light from said source, and a plate adapted to direct the said diffused rays upon said indicating-dial, substantially as described.

3. In an indicating instrument, the combination of an indicating-dial, a source of light, and a plate adapted to diffuse the rays of light from said source, and direct said diffused light against said indicating-dial, substantially as described.

4. In an indicating instrument, the combination of an indicating-dial, a source of light, a plate at the side of said dial, and adapted to diffuse the rays of light from said source, and direct the same against said indicating-dial, substantially as described.

5. In an indicating instrument, the combination of an indicating-dial, a source of light, and a non-translucent plate having a white diffusing-surface upon which said light is directed, said plate being adapted to direct the said diffused light against said indicating-dial, substantially as described.

6. In an indicating instrument, the combination of an indicating-dial, a source of light, a plate having an unpolished white diffusing-surface upon which said light is directed, and means for directing the light from said diffusing surface to the indicating-dial, substantially as described.

In testimony whereof I have affixed my signature in presence of two witnesses.

FRANK W. ROLLER.

Witnesses:
E. E. SNIDER,
C. V. EDWARDS.